WEIGHT PERCENT VINYL ACETATE IN ETHYLENE VINYL ACETATE COPOLYMER (AREA UNDER CURVE IS COMPATIBLE)

United States Patent Office 3,419,641
Patented Dec. 31, 1968

3,419,641
HOT MELT ADHESIVE COMPRISING AN AROMATIC-ALDEHYDE RESIN AND AN ETHYLENE-VINYL ACETATE COPOLYMER
Melvin E. Peterkin, Brookhaven, Pa., and Lewis W. Hall, Jr., Claymont, Del., assignors to Sun Oil Company, Philadelphia, Pa., a corporation of New Jersey
Continuation-in-part of application Ser. No. 372,354, June 3, 1964. This application Mar. 18, 1966, Ser. No. 535,366
5 Claims. (Cl. 260—897)

ABSTRACT OF THE DISCLOSURE

A hot melt adhesive composition comprising 35 to 75 wt. percent of an aromatic hydrocarbon-aldehyde resin having a ring and ball softening point from 70 to 150° C. and from 25 to 65 wt. percent of an ethylene vinyl acetate copolymer containing 17 to 42 wt. percent vinyl acetate. A typical and exceedingly useful composition within this area is one made of 70% formolite type of resin having a ring and ball of 95° C. and 30% of an ethylene vinyl acetate copolymer having 33 wt. percent vinyl acetate. This composition and compositions similar thereto are capable of making corrugated paper board which has a number of advantages over corrugated paper board presently made from water based adhesives but which has essentially the same strength properties as conventional corrugated paper board.

---

Figure 1:
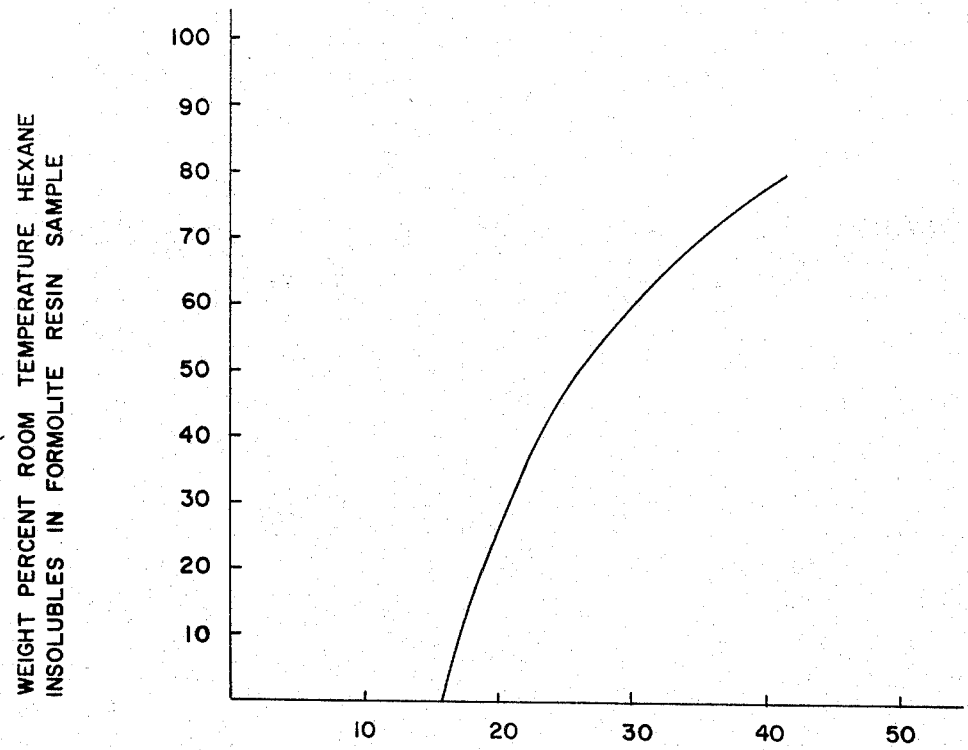

This application is a continuation-in-part of Ser. No. 372,354, filed June 3, 1964, and now abandoned. This invention relates to hot melt adhesive compositions. In particular, it relates to hot melt adhesive compositions produced from low-cost materials and suitable for bonding a variety of materials together.

Hot melt adhesives produce a bond by mere cooling as distinguished from cross-linking or other chemical reactions. Prior to heating, the hot melt adhesives are solids that can be prepared in bulk or pellet form for ease of handling. Upon heating, the hot melt adhesive composition melts and flows freely for application to a substrate. Since the hot melt adhesive of the present invention are thermoplastic rather than thermosetting, and thus remeltable, they can be applied to a substrate at one time and later remelted to form a hot melt bond with another substrate.

Hot melts are useful adhesives for bonding wood, paper, plastics, textiles and other materials. One use for which they are well suited is the fabrication of corrugated paper board. Hot melts used for producing corrugated paper board must have high bond strength under conditions of shock, stress, high humidity and extremes of temperature encountered in transportation and storage. In addition, the melt point, wetting time, initial tack, setting time, pot life and general handling qualities on automatic corrugated board machinery are essential considerations.

We have found that the object of providing a high performance, low-cost, hot melt adhesive can be obtained by blending an aromatic hydrocarbon-aldehyde (formolite) resin with a copolymer of ethylene and vinyl acetate in certain proportions. The compositions of the invention have excellent properties for use in bonding materials, particularly paper. More particularly, the hot melt adhesives of the invention can be used to bond the corrugating medium to the top and bottom facer sheets in the making of corrugated paper board.

Hot melt adhesives prepared according to the present invention have been extensively tested for the production of corrugated paper board. In comparative test with corrugated paper board produced from conventional starch based adhesives (including starch-resorcinol) the corrugated paper board produced from the instant hot melt adhesives were equal to the starch adhesive products in nearly all properties and superior in some properties.

The use of a hot melt adhesive instead of starch based adhesives has as its principal advantage, the providing of the means to allow corrugated paper board to be produced at high rates of speed not possible with even the most expensive starch or water based adhesives. This advance is achieved by the elimination of water from the hot melt adhesive. The presence of water in conventional adhesives and the necessity for its subsequent removal from the paper board produced therefrom has been the limiting factor in the speed at which the paper board could be produced.

By the use of hot melt adhesives, corrugated paper board machinery can be run at speeds up to and beyond twice that possible with the water containing adhesives. Such speeds have been achieved on conventional corrugated paper board machinery which has been modified for hot melt adhesives.

Aromatic hydrocarbon-aldehyde resins are well known in the art. Their preparation is described in many patents including U.S. Patent No. 1,827,538 and U.S. Patent No. 2,992,208 and in the literature see for example Walker, Formaldehyde, 2nd Edition, Reinhold Pub. Corp., New York, 1964, pp. 342–345.

Typical feedstocks for the formolite reaction include aromatic hydrocarbon fractions boiling in the range of from about 200° F. to 950° F., derived from petroleum refinery streams such as cracked fractions, cycle streams, hydroformer bottoms, fuel oil, straight run distillates and pure aromatic fractions. The gas oil fraction from catalytic cracking, boiling in the range of from about 450° F. to about 650° F. and containing 15 to 50% aromatic hydrocarbons is a particularly preferred feedstock.

Suitable pure aromatic hydrocarbons include for example benzene, alkylbenzenes, naphthalene, alkylnaphthalene, hydrogenated naphthalenes or mixtures of such pure aromatic hydrocarbons. Some specific aromatic hydrocarbons are benzene, toluene, ethylbenzene, diethylbenzene, naphthalene, alpha-methylnaphthalene, beta-methylnaphthalene, ethylnaphthalene, tetralin and the like.

Suitable aldehydes are formaldehyde and materials which yield formaldehyde under the conditions of the reaction such as formalin, paraformaldehyde, trioxymethylene and trioxane. Of this group, formaldehyde and paraformaldehyde are preferred because of availability and handling ease. Other aldehydes such as acetaldehyde, propionaldehyde and butylaldehyde can be used. The aldehyde is used in amounts ranging from 1 to 30 wt. percent based on the aromatic hydrocarbons in the charge.

Many catalysts have been used for the formolite reaction including $H_2SO_4$, HF, formic acid, phosphoric acid, $BF_3$, metal chlorides and other acid acting catalysts. It is preferred to use sulfuric acid or $BF_3$. It is necessary that acetic acid be present. It serves as a modifier for sulfuric acid and for $BF_3$.

The following conditions can be used: temperature—10° C. to 200° C., preferably 30° C. to 150° C.; pressure—10 to 250 p.s.i.a., preferably 14 to 120 p.s.i.a.; reaction times—10 minutes to 10 hours.

Conventional equipment is used in the preparation of the formolite resin and in blending the resin cut with the ethylene-vinyl acetate copolymer.

The following non-limiting examples describe a preferred embodiment of the invention.

EXAMPLE I

One formolite resin was prepared in the following manner: twelve gallons of catalytic gas oil having a boiling range of 400° F. to 650° F. and containing 43% aromatics (gel) were placed in a 20 gallon glass-lined reactor equipped with a turbine agitator.

Next, four pounds of paraformaldehyde and two gallons of acetic acid were added and the mixture heated to 200° F. by means of a hot oil bath. In a separate reaction vessel 4.56 pounds of $BF_3$ were complexed with 0.80 gallons of acetic acid. The catalyst complex was added to the other ingredients. Temperature was maintained at about 220° F. No pressure was applied. After 15 minutes, heating was discontinued and the acid layer was drawn off. The remaining reactor contents were washed 3 times with 750 ml. $H_2O$, followed by 3 additional washings with 4 gallons of $H_2O$. The water was decanted and the reactor contents transferred to vacuum distillation apparatus. The following cuts were separated: initial boiling point to 651° F., 62.8% (this is considered as unreacted feed); 652° F. to 814° F., 5.1%; 815° F. to 901° F., 10.9%; and 901° F., 21.1%. The 652° F. to 814° F. fraction is a light yellow liquid resin. The 815° F. to 901° F. fraction is a soft solid resin having a ring and ball melt point of 45° C. to 50° C. These two fractions are not ordinarily used in the hot melt adhesive composition of the invention and they can be recycled to a subsequent reaction to be upgraded to hard resin.

The distillation bottoms boiling above 901° F. and having a ring and ball melt point of 129° C. (264° F.) is the type of hard formolite resin used in the adhesive composition of the invention. Hard resins having a ring and ball melt point of 70 to 150° C., preferably 90 to 140° C., are suitable formolite components.

A hard resin prepared according to the above description was analyzed by means of standard combustion methods and was found to contain approximately 2.8 wt. percent oxygen.

EXAMPLE II

A second formolite resin was prepared in the following manner:

226 pounds of catalytic gas oil having a boiling range of 448° F. to 572° F. and containing 47.3% aromatics (gel) and 14 pounds of paraformaldehyde were placed in a 50 gallon glass-lined reactor equipped with an agitator. The mixture was heated to a temperature in the range of 190° F. to 230° F.

Next, 18 pounds of 96 wt. percent sulfuric acid was slowly added to 55 pounds of glacial acetic acid with stirring and the acid mixture was slowly metered to the reactor with agitation.

The reaction mixture was stirred for about 30 minutes at a temperature ranging from 190° F. to 230° F. A closed system was used and the pressure slowly rose to about 32–33 p.s.i.g.

Heating was discontinued, the acid layer was removed by settling, and the reaction products were pumped hot to water washing facilities. The products were washed four times. Water was removed by settling and the reaction product was vacuum distilled. 30.7 pounds of hard resin were recovered. This represented a bottoms fraction boiling above about 500° F. at 1 mm. The material had a ring and ball melt point of 104° C. (220° F.). This resin and others prepared as shown in Examples I and II were analyzed for acetate content and were found to contain from about .1 to about 1.0 acetate groups per molecule of formolite resin. Analysis was obtained by saponification number and infrared spectra.

EXAMPLE III

Example II was repeated but the distillation of the product was carried out at 10 mm. and 330° C. This resin was analyzed and found to have no acetate content.

It was found that hot melt compositions produced from formolite resin containing acetate or having no residual acetate have the same characteristics. Thus the presence or absence of said acetate groups is of no distinction in the present invention, except to the extent noted below.

The formolite type resins employed in the compositions of the present invention may be further characterized by their hexane solubility. The solubility characterization involves a room temperature hexane insoluble fraction, a cold hexane insoluble fraction and a cold hexane soluble fraction. In order to make this characterization a mixture of 30 weight percent resin in hexane is heated to reflux then left at room temperatuer for 16 hours. The hexane solvent is removed from the insoluble material and the solvent cooled to 0° C. After 4 hours the hexane is again removed from the insoluble material. The insoluble materials are dried and the weight percent of the total resin they represent is determined. Table I shows some typical characterizations of this type.

TABLE I.—HEXANE FRACTIONATION OF AROMATIC FORMALDEHYDE RESINS

| | A | B | C | D |
|---|---|---|---|---|
| Charge stock | CGO | CGO | CGO | AE |
| R & B (° C.) | 103 | 115 | 106 | 122 |
| Room temperature hexane insolubles (25° C.): | | | | |
| Weight percent | 11 | 27 | 64 | 94.5 |
| R & B (° C.) | 131 | 137 | 126 | 130 |
| Gardner color | 18+ | 18+ | 18+ | 18+ |
| Cold hexane insolubles (after 4 hours at 0° C.): | | | | |
| Weight percent | 26 | 22 | 8 | 0.5 |
| R & B (° C.) | 120 | 128 | 113 | |
| Gardner color | 18+ | 18 | 15 | |
| Cold hexane solubles: | | | | |
| Weight percent | 63 | 51 | 28 | 5 |
| R & B (° C.) | 93 | 100 | 74 | |
| Gardner color | 11.5 | 12.5 | 10 | |

CGO—Catalytic gas oil similar to charge of Examples 1, 2 and 3.
AE—Aromatic extract—highly aromatic approximately 98% aromatics (gel).

Resins containing residual acetate groups such as those produced in Examples I and II are found to contain a larger percent of room temperature hexane insolubles than resins that do not contain residual acetate groups. It is believed that the presence of acetate groups on molecules that would otherwise be hexane soluble accounts for this increased insolubility.

In regard to the present invention hexane solubilities for the formolite resins are performed only on the acetate free resins. Acetate groups may be easily removed from formolite resins by either redistillation according to Example III or by heating the resin for 30 minutes at about 330° C.

Generally suitable hydrocarbon aldehyde resins for the present invention have from 5 to 65 parts by weight hexane room temperature insolubles, 5 to 30 parts by weight cold hexane insolubles and 30 to 70 parts by weight cold hexane solubles.

The preparation of ethylene-vinyl acetate copolymer is known in the art. Preparations are shown in U.S. Patent No. 2,200,429 to Perrin et al. and Canadian Patent No. 657,977 to Strauss, dated Jan. 29, 1963. Generally, the preparation involves copolymerizing a mixture of ethylene and vinyl acetate by means of a free-radical-producing catalyst, such as oxygen or an organic peroxide at a pressure of 100 to 200 atmospheres and a temperature in the range of 150° C. to 250° C. and recovering the product. The proportion of vinyl acetate in the copolymer appears to be important. Since hot melt adhesives must have sustained pot life and fast setting times, the requirement of a stable homogeneous mixture is critical.

The hot melt adhesive is made by thoroughly mixing the ingredients at a temperature in the range of 200° F. to 400° F. and preferably 300° F. to 350° F.

For application to a surface the adhesive is heated to a temperature in the range of 250° F. to 350° F. and applied to the surfaces which are to be joined in any suitable manner.

Suitable relative amounts of ingredients are from about 25 to about 65 wt. percent ethylene-vinyl acetate copolymer and from about 35 to about 75 wt. percent aromatic hydrocarbon-aldehyde resin.

Hot melt adhesives can be accurately screened for general applicability by two simple tests with kraft paper.

The first is the tear seal test. The sample is made on 50 pound kraft paper cut into 1 by 6 inch strips. One strip is coated on a single side for a length of two inches with a 1 to 2 mil coating of hot adhesive and another strip is placed over the first strip. The sample then consists of two layers of paper bonded together on internal surfaces over a two square inch area at one end. The test is made by gripping the free ends of the strips and pulling slowly in opposite directions perpendicular to the bond. A tear seal is indicated when the adhesive bond produces failure in the substrate (in this case, kraft paper) at room temperature and at −25° F. The latter temperature is used to test for brittleness at extremely severe low temperature service conditions the bond might encounter.

The second is the delamination test. This test is made by forming a 2 inch lap joint with two 1 by 6 inch 50 pound kraft paper strips. The sample is joined by a two square inch area of adhesive having thickness of 1 to 2 mils. The total length of the sample is 10 inches. The strip is suspended in a 150° F. oven for one-half hour. There should be no indication of the paper substrates parting in order to pass the test.

The ethylene-vinyl acetate copolymer resins employed are "Elvax" resins marketed by Du Pont Chemical Company. Properties of some Elvax resins appear in Table II.

the ethylenevinyl acetate copolymers employed in the present invention is 17 to 24 wt. percent and preferably 25 to 34 wt. percent. A particularly good copolymer is one having about 33 wt. percent vinyl acetate, i.e. 32–34.

FIGURE 1 is submitted in order to provide a means for those skilled in the art to determine what weight percent vinyl acetate must be present in the ethylene-vinyl acetate copolymer to achieve a homogeneous mixture which will not separate on standing hot.

The area under the curve represents the weight percent vinyl acetate ($y$ axis) is an ethylene-vinyl acetate copolymer which is capable of forming a lasting homogeneous mixture on standing hot with a formolite resin having the indicated weight percent room temperature hexane insolubles ($x$ axis).

FIGURE 1 is merely a guide and is a near approximation for ethylene-vinyl acetate copolymers having 17 to 42 weight percent vinyl acetate.

EXAMPLE IV

The following runs show the characteristics of various formolite resin-ethylene-vinyl acetate copolymer hot melt adhesive blends.

TABLE III

| Sample No. | Adhesive components | | | | | Product | | | |
| --- | --- | --- | --- | --- | --- | --- | --- | --- | --- |
| | Formolite resin [1] (wt. percent) | Formolite catalyst | Formolite melt point R & B, °C. | Ethylene-vinyl acetate copolymer (wt. percent) | Copolymer type and vinyl acetate content (Wt. %) | Melt point R & B, °C. | Tear seal | | Delamination, 150° F. |
| | | | | | | | 70° F. | −25° F. | |
| 1 | [2] 70 | H₂SO₄+acetic acid | 98 | 30 | 18 (Elvax 420) | Incompatible on heating and separates on standing | | | |
| 2 | [2] 70 | do | 98 | 30 | 18 (Elvax 460) | | | | |
| 3 | [2] 80 | BF₃+acetic acid | 116 | 20 | 28 (Elvax 250) | 109 | Yes | No | No |
| 4 | [2] 70 | do | 117 | 30 | 33 (Elvax 150) | 110 | Yes | Yes | No |
| 5 | [2] 70 | H₂SO₄+acetic acid | 95 | 30 | 33 (Elvax 150) | 82 | Yes | Yes | No |
| 6 | [2] 50 | BF₃+acetic acid | 117 | 50 | 33 (Elvax 150) | 91 | Yes | Yes | No |

[1] Approximately the same as sample B in Table I.
[2] 1% antioxidant (BHT) added in compounding adhesive.

TABLE II

| | Melt index | Percent vinyl acetate | Inherent viscosity at 30° C. (0.25 g./100 ml. toluene) | Density, g./cc. at 23° C. (ASTM D 1505) | Refractive index $n_D^{25}$ | Softening point ring & ball, °F. (ASTM E28) |
| --- | --- | --- | --- | --- | --- | --- |
| Elvax 40 | 45–65 | 39–42 | 0.70 | 0.965 | 1.476 | 200 |
| Elvax 150 | 22–28 | 32–34 | 0.78 | 0.957 | 1.482 | 240 |
| Elvax 210 | 340–470 | 27–29 | 0.59 | 0.951 | 1.488 | 180 |
| Elvax 220 | 125–175 | 27–29 | 0.63 | 0.949 | 1.485 | 190 |
| Elvax 240 | 22–28 | 27–29 | 0.78 | 0.951 | 1.485 | 250 |
| Elvax 250 | 12–18 | 27–29 | 0.85 | 0.951 | 1.485 | 280 |
| Elvax 260 | 5–7 | 27–29 | 0.94 | 0.954 | 1.485 | 310 |
| Elvax 310 | 335–465 | 24–26 | 0.54 | 0.949 | 1.486 | 190 |
| Elvax 350 | 16–22 | 24–26 | 0.84 | 0.947 | 1.489 | 280 |
| Elvax 360 | 1.6–2.4 | 24–26 | 1.05 | 0.950 | 1.491 | 370 |
| Elvax 420 | 125–175 | 17–19 | 0.54 | 0.937 | 1.492 | 210 |
| Elvax 460 | 2.1–2.9 | 17–19 | 0.98 | 0.941 | 1.493 | 390 |

It has been found that where the formolite resin contains a large weight percent of room temperature hexane insolubles such as sample C in Table I that the ethylene vinyl acetate copolymer must contain for example at least 25 weight percent vinyl acetate in order to get a homogeneous mixture of the copolymer with the formolite resin. However by employing a formolite such as that of sample A or B in Table I the ethylene-vinyl acetate may contain as little as 17 weight percent vinyl acetate and produce homogeneous blends, whereas ethylene-vinyl acetate having up to 34 weight percent vinyl acetate is incompatible with formolite resins such as those of sample D, Table I. A suitable range of vinyl acetate content for Runs 1 and 2 show that ethylene-vinyl acetate copolymers containing about 18% vinyl acetate are incompatible with the particular formolite resin employed. Run 3 shows that an adhesive composition containing 28% copolymer does not give a tear seal at −25° F. Runs 3–5 indicate that adhesives containing at least 25% ethylene-vinyl acetate copolymer and in which the vinyl acetate concentration is at least 25% pass both the tear seal test and the delamination test in conjunction the particular formolite. It is believed that the combination of a formolite resin and an ethylene-vinyl acetate containing a certain minimum quantity of acetate groups in relation to the formolite constitution provides a uniquely homogeneous adhesive having excellent performance characteristics even under severe environmental conditions.

The adhesive of Example 6 was used for a spot trial on an experimental corrugator with conventional 42 lb. kraft liner and regular 26 lb. semichemical corrugating medium. The adhesive performed well on the adhesive roll and the transfer roll and provided a good bond.

The adhesive compositions of the present invention can contain functional materials such as plasticizers, tackifiers, fillers, solvents, thinners, antioxidants, surfactants, and coloring agents.

Suitable plasticizers include the phthalates, such as dioctylphthalate, butyl benzyl phthalate, butyl cyclohexyl phthalate, etc.; phosphate esters, such as tricresyl phosphate, cresyl diphenyl phosphate; sulfonamides; chlorinated biphenyls; hydrocarbon oils, waxes, etc. These can be selected from the multitude of adhesive plasticizers available on the basis of compatibility, processing characteristics, stability and cost.

The examples presented herein are intended to be merely illustrative and are not intended to limit the scope of the claims. Certain ranges of components have been specified and it is to be understood that those of skill in the art will be able to select the respective proportion from each range so as to produce compositions within the spirit and scope of the invention. The examples provide the guidelines to indicate to those of skill in the art the means and manner of component selection and compounding.

The invention claimed is:

1. A thermoplastic hot melt adhesive composition comprising a homogeneous mixture of from about 35 to 75 weight percent of an aromatic hydrocarbon-aldehyde resin having a ring and ball softening point in the range of from about 70 to 150° C. and from about 25 to about 65 weight percent of an ethylene-vinyl acetate copolymer having a ring and ball softening point in the range of 190–390° F. containing from 17 to 42 weight percent vinyl acetate.

2. A thermoplastic hot melt adhesive composition according to claim 1 wherein the ethylene-vinyl acetate copolymer contains from 25 to 42 weight percent vinyl acetate.

3. A thermoplastic hot melt adhesive composition according to claim 3 wherein the ethylene-vinyl acetate copolymer contains from 32 to 34 weight percent vinyl acetate.

4. A thermoplastic hot melt adhesive composition according to claim 1 wherein the aromatic hydrocarbon-aldehyde resin has a ring and ball softening point in the range of from 90 to 140° C.

5. A thermoplastic hot melt adhesive composition according to claim 1 wherein the aromatic hydrocarbon-aldehyde resin contains from 5 to 65 parts by weight room temperature hexane insolubles, 5 to 30 parts by weight 0° C. hexane insolubles and 30 to 70 parts by weight 0° C. hexane solubles.

References Cited
UNITED STATES PATENTS

| | | | |
|---|---|---|---|
| 3,125,545 | 3/1964 | Van Cleve et al. | 260—897 |
| 3,218,373 | 11/1965 | Salyer | 260—897 |
| 3,256,228 | 6/1966 | Tyran | 260—28.5 |
| 2,975,150 | 3/1961 | Johnson et al. | 260—897 |
| 3,245,931 | 4/1966 | Matthew | 260—897 |
| 3,247,142 | 4/1966 | Brunson et al. | 260—897 |
| 3,262,996 | 7/1966 | Kurtz et al. | 260—897 |

MURRAY TILLMAN, *Primary Examiner.*

C. J. SECCURO, *Assistant Examiner.*

U.S. Cl. X.R.

117—148, 155, 161; 156—327; 161—251; 260—30.6, 30.8, 31.8, 33.6, 33.8